United States Patent [19]

Devine et al.

[11] Patent Number: 4,990,749
[45] Date of Patent: Feb. 5, 1991

[54] TEMPERATURE CONTROLLER FOR A FOOD MERCHANDISER

[75] Inventors: Michael E. Devine; Michael D. Grassmuck, both of Bridgeton; Mason E. Laster, Jr., St. Louis; Nai H. Mak, Clayton, all of Mo.

[73] Assignee: Hussmann Corporation, Bridgeton, Mo.

[21] Appl. No.: 348,677

[22] Filed: May 5, 1989

[51] Int. Cl.$^5$ .............................. H05B 3/48
[52] U.S. Cl. ............................. 219/385; 219/214; 219/354
[58] Field of Search ............... 219/385, 386, 387, 214, 219/415, 417, 419, 430, 439, 441, 435, 405, 411, 354; 126/33

[56] References Cited

U.S. PATENT DOCUMENTS

| 2,392,635 | 1/1946 | Bletz . | |
| 2,820,130 | 1/1958 | Dadson . | |
| 2,863,979 | 12/1958 | Fitzgerald . | |
| 2,914,644 | 11/1959 | Holtkamp . | |
| 2,933,585 | 4/1960 | Holtkamp | 219/413 |
| 3,003,048 | 10/1961 | Scott . | |
| 3,062,941 | 11/1962 | White . | |
| 3,119,001 | 1/1964 | Andrews | 219/413 |
| 3,120,599 | 2/1964 | Hilgers . | |
| 3,632,968 | 1/1972 | Wilson | 219/214 |
| 3,646,319 | 2/1972 | Auld | 219/347 |
| 4,074,108 | 2/1978 | King | 219/214 |
| 4,081,645 | 3/1978 | Javes et al. | 219/10.55 |
| 4,119,834 | 10/1978 | Losch | 219/354 |
| 4,320,285 | 3/1982 | Koether | 219/441 |
| 4,343,985 | 8/1982 | Wilson | 219/214 |
| 4,356,385 | 10/1982 | Stein | 219/386 |
| 4,486,648 | 12/1984 | Grasso | 219/448 |
| 4,812,625 | 3/1989 | Ceste | 219/497 |
| 4,822,981 | 4/1989 | Chaudoir | 219/385 |
| 4,856,287 | 8/1989 | Oike | 62/126 |
| 4,864,088 | 9/1989 | Hiejima | 219/10.55 |
| 4,874,928 | 10/1989 | Kasai | 219/492 |
| 4,875,342 | 10/1989 | Ikeda | 62/115 |
| 4,885,456 | 12/1989 | Tanaka | 219/497 |

Primary Examiner—Teresa J. Walberg
Attorney, Agent, or Firm—Richard G. Heywood

[57] ABSTRACT

This invention is an apparatus for controlling food temperatures in a food warming cabinet having at least one food holding zone. The apparatus includes a first sensor for sensing a temperature representative of the temperature of the food, a heater, a second sensor for sensing a temperature representative of an operating condition of the apparatus, and a control circuit connected to receive sensed input signals from the first and second sensors, and being constructed and arranged for controlling the operation of the heater in response to the sensed input signals and for selecting a set point value forming an ideal temperature condition for the food.

33 Claims, 7 Drawing Sheets

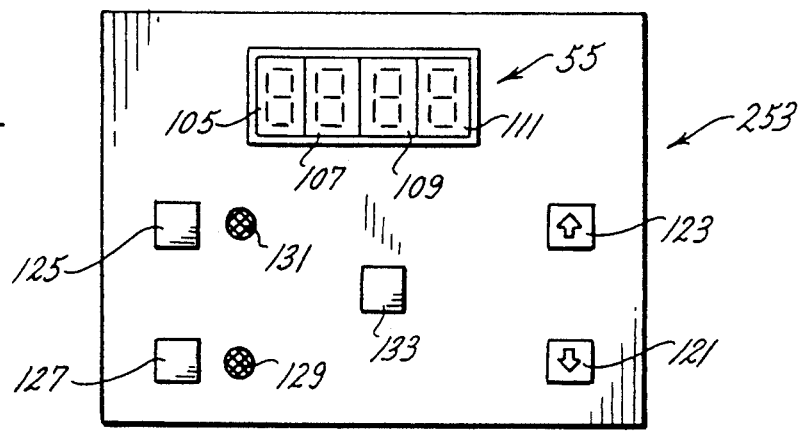
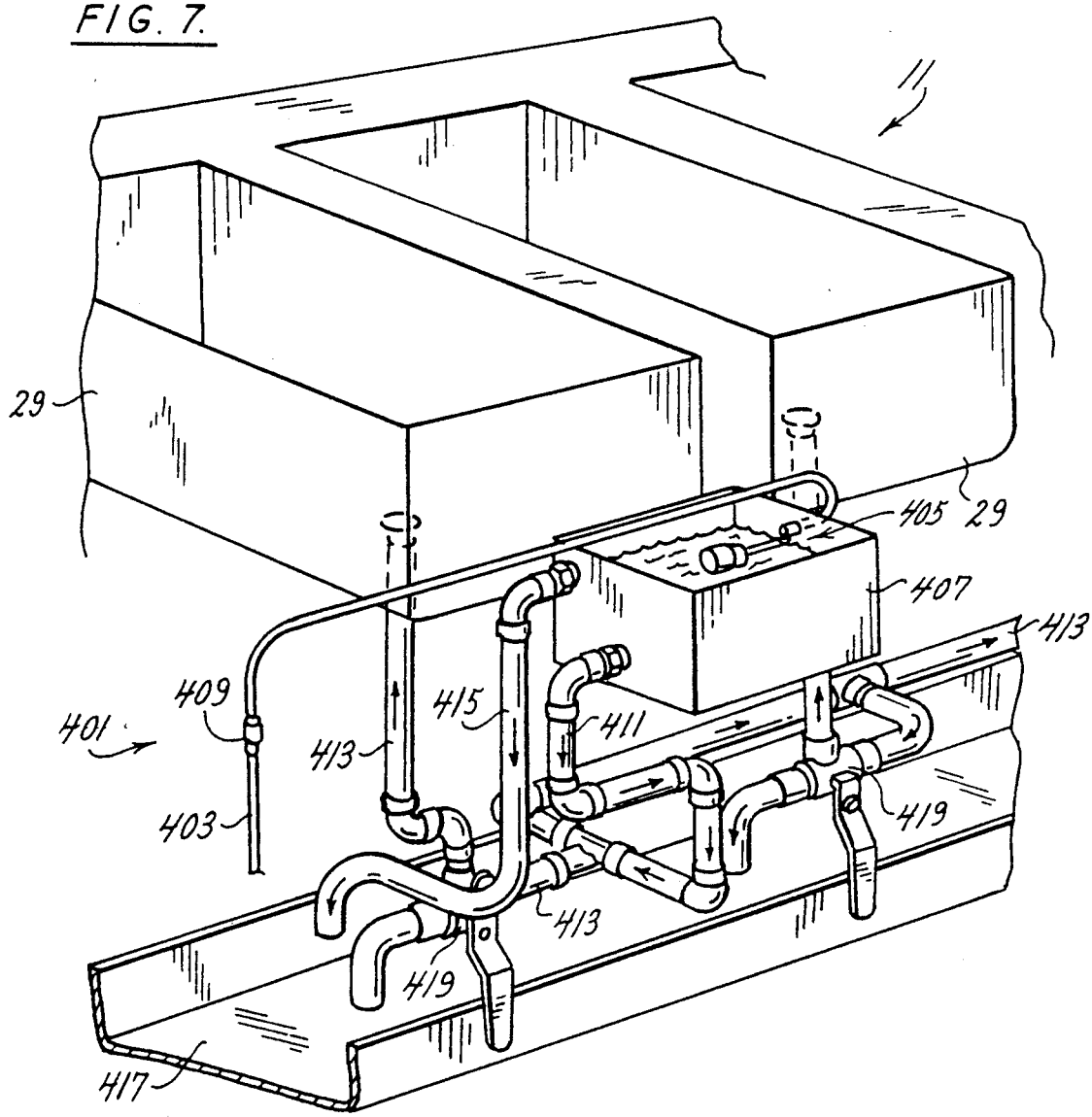

TEMPERATURE CONTROLLER FOR A FOOD MERCHANDISER

BACKGROUND OF THE INVENTION

This invention relates to a temperature controller for a food merchandiser and in particular an electronic controller for controlling warming of food in a hot table.

Hot tables display and warm prepared or pre-cooked foods to be purchased by customers. The food is heated from both an upper and a lower heat source to maintain the food product at a desired temperature. The lower and upper heat sources are manually adjustable and experience is required in being able to adjust the heat sources to an optimum setting. Health departments require that the food to be warmed be kept at a low enough temperature which does not cook the food and at a high enough temperature which does not allow microorganisms to grow. A typical temperature range which prepared food should be kept warmed in a hot table is 140° F. and 170° F. However, what typically happens is the temperature controls of the hot table are initially adjusted to their highest temperature settings. If the heat sources are not readjusted properly during the time the food is being displayed and kept warm the food could begin to cook. It is also possible that the hot table may be damaged due to excessive heat. This has been a major concern in the maintenance of hot tables.

Additionally, with manually adjusted hot tables there is no indication of whether the heat sources are functioning properly or if the hot table is warm. It is desirable to know when any of the heat sources has malfunctioned for replacing the heat source. Also, in order to clean the hot table it is desirable to know when the hot table has cooled to a temperature in which an operator may safely clean the hot table.

Hot tables also include water pans which are filled with water. The water pans are heated by the lower heat sources and the water evaporates. This evaporation requires monitoring by the operator to fill the water pans in order to reduce damaging the water pans due to excessive heat. Additionally, cool water added to the hot water pans could result in cracking or damaging the water pans. There is therefore a need to provide an automatic water filling system for water pans in a hot table.

SUMMARY OF THE INVENTION

Among the objects of the present invention is the provision of a temperature controller for a food merchandiser which is capable of automatically controlling the temperature of food in the food merchandiser; the provision of a temperature controller for a food merchandiser which monitors the temperature of the food; the provision of a temperature controller for a food merchandiser which indicates a malfunction in one or all of the heat sources; and the provision of a temperature controller for a food merchandiser which monitors the water level and maintains the water level at a predetermined level.

Generally, one form of the invention is an apparatus for controlling food temperatures in a display fixture having at least one food holding zone. The apparatus includes first means for sensing a temperature representative of the temperature of the food, a first temperature producing means, a second means for sensing a temperature representative of an operating condition of the apparatus, and controller means connected to receive sensed input signals from the first and second means, and being constructed and arranged for controlling the operation of the first temperature producing means in response to the sensed input signals.

Another form of the invention is a device for controlling warming of food in a hot table, the hot table including an upper heat source and a lower heat source. The device includes first means for sensing a temperature representative of the food and controller means connected to receive sensed input signals from said first means and being constructed and arranged for controlling the operation of both the heat sources in response to the sensed input signals.

A method of the invention involves a method of controlling food temperatures in a display fixture having at least one food holding zone and first and second temperature producing means therefor. The method involves the steps of sensing a temperature condition of the food in the food holding zone and establishing an input data base representative of such condition, analyzing said input data base with respect to a predetermined set point value forming an ideal temperature condition for the food and producing a control signal, controlling the operating conditions of the first temperature producing means when said control signal exceeds the limits of a positive to negative tolerance range from said set point value, and regulating the intensity of the second temperature producing means when said control signal is within the tolerance range but deviates from said set point value whereby to substantially maintain said food holding zone at said set point value.

Other objects and features will be in part apparent and in part pointed out hereinafter.

BRIEF DESCRIPTION OF THE DRAWINGS

FIG. 5 is a front plan view of a control panel of the hot table of FIG. 1;

FIG. 7 is a partial perspective view, partly broken away, of an automatic water fill system of the hot table of FIG. 1.

Corresponding reference characters indicate corresponding parts throughout the several views of the drawings.

DETAILED DESCRIPTION OF THE PREFERRED EMBODIMENTS

Figure 1:
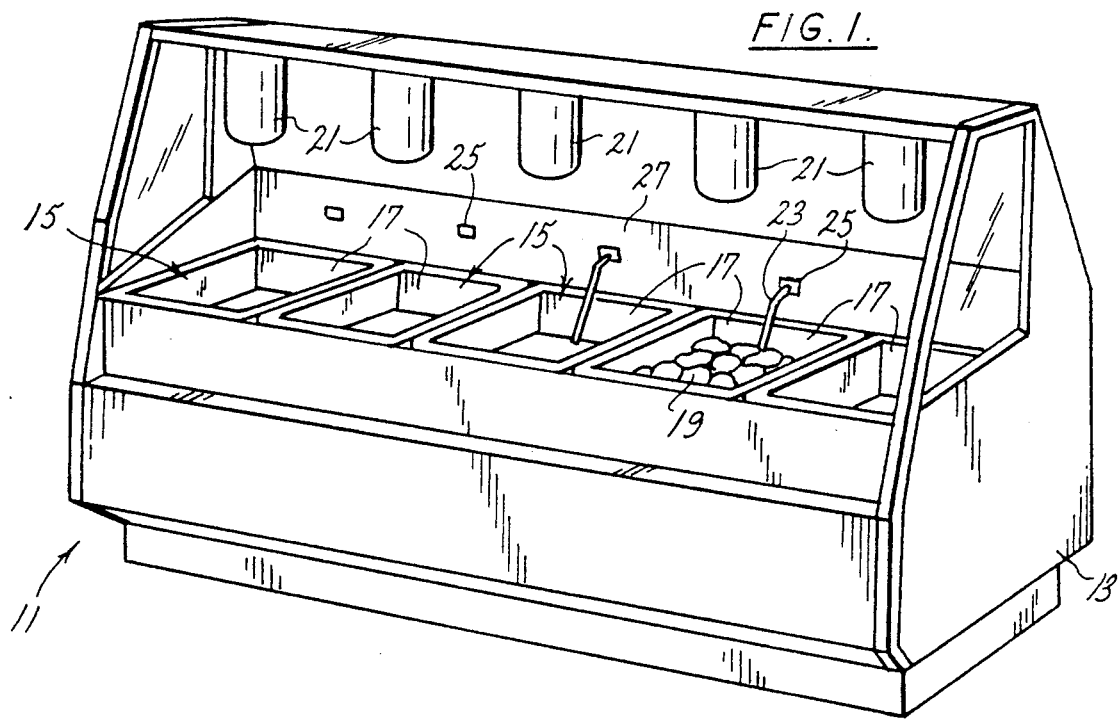
FIG. 1 is a perspective view of a hot table of the present invention.

Referring now to the drawings, a hot table of the present invention is designated generally by reference numeral 11 in the drawings. The hot table 11 includes a display fixture or case 13 having a plurality of food holding zones 15, for example five. Each of the zones 15 includes a food pan 17 for containing food 19 to be warmed. Upper heat sources 21, for example floodlamps or ceramic infrared heaters, are provided for both heating and illuminating food 19 in the food pans 17. The hot table 11 also includes probes 23 which are adapted to be inserted into food 19 to be warmed. The probes 23 are connected to receptacles 25 located in a back wall 27 of the hot table 11. The receptacles 25 are connected to an electronic controller (FIG. 3) located in the back of the case 13.

Figure 2:
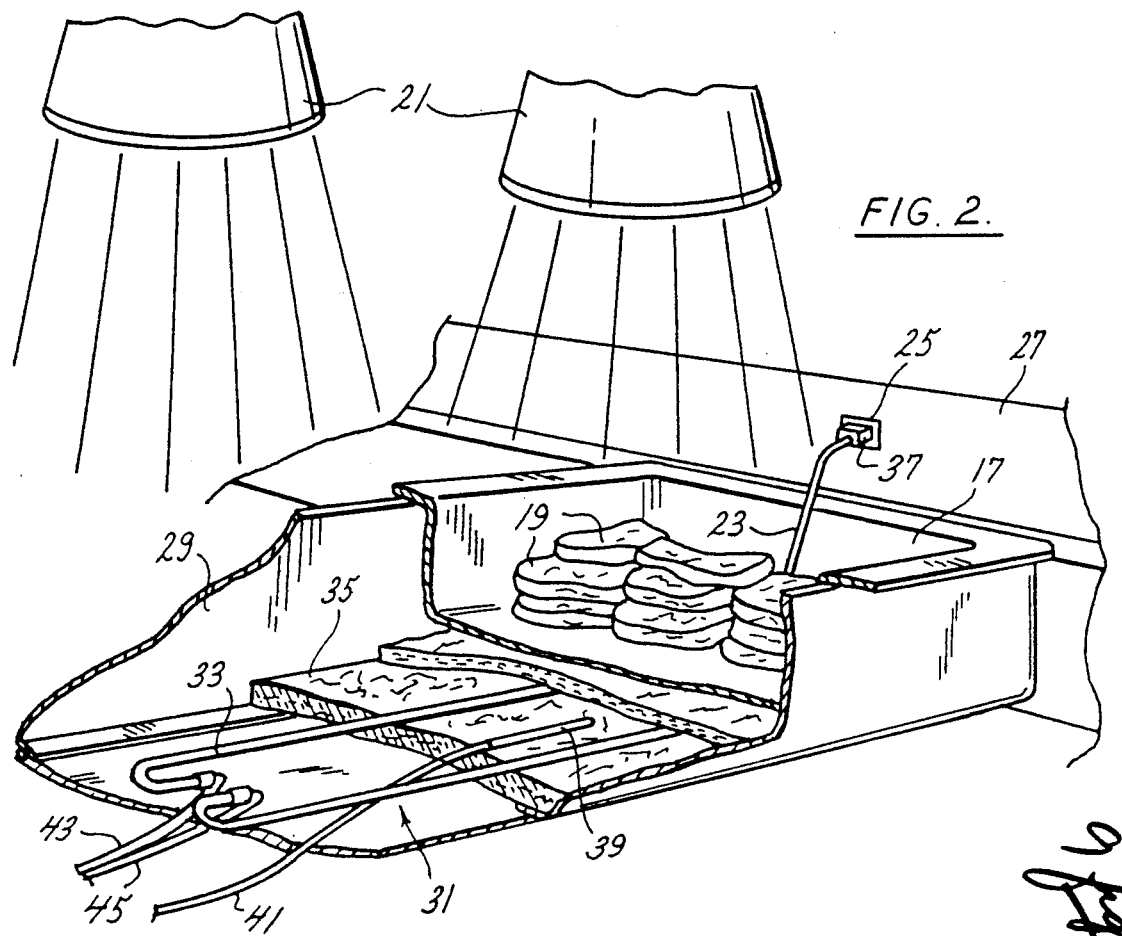
FIG. 2 is a partial perspective view, partly broken away, of a food pan of the hot table of FIG. 1.

FIG. 2 illustrates one of the food pans 17 showing some of the elements of the hot table 11 and the food pan 17 partially broken away. Food pan 17 fits in a water pan 29. Water pan 29 is filled with water which is heated by a lower heat source 31 mounted to the bottom of the water pan 29. The lower heat source 31 may be a cal-rod type heater which includes a heating element 33 and a layer of insulation 35. Prepared food is placed in the food pan 17. In order to monitor the temperature of the food 19 a thermocouple or probe 23 is inserted into the food 19. The probe 23 is formed of stainless steel or a food quality plastic that is bendable. The hot table operator may easily position the probe 23 for insertion into the food 19. In the interior of the probe 23 at an end of the probe 23 which is inserted into the food 19 is the thermocouple or temperature sensing device (not shown). The probe 23 also has a molded plastic plug 37 at another end which is connected to the receptacle plug 25 located in the back wall 27 of the case 13. The receptacle 25 is connected to the controller via lines (not shown). A second probe 39 is adjacent the lower heat source 31 for monitoring the temperature of the lower heat source 31. The second probe 39 is connected to the controller via lines 41. The heating element 33 of the lower heat source 31 is connected to the controller via lines 43 and 45.

Figure 3:
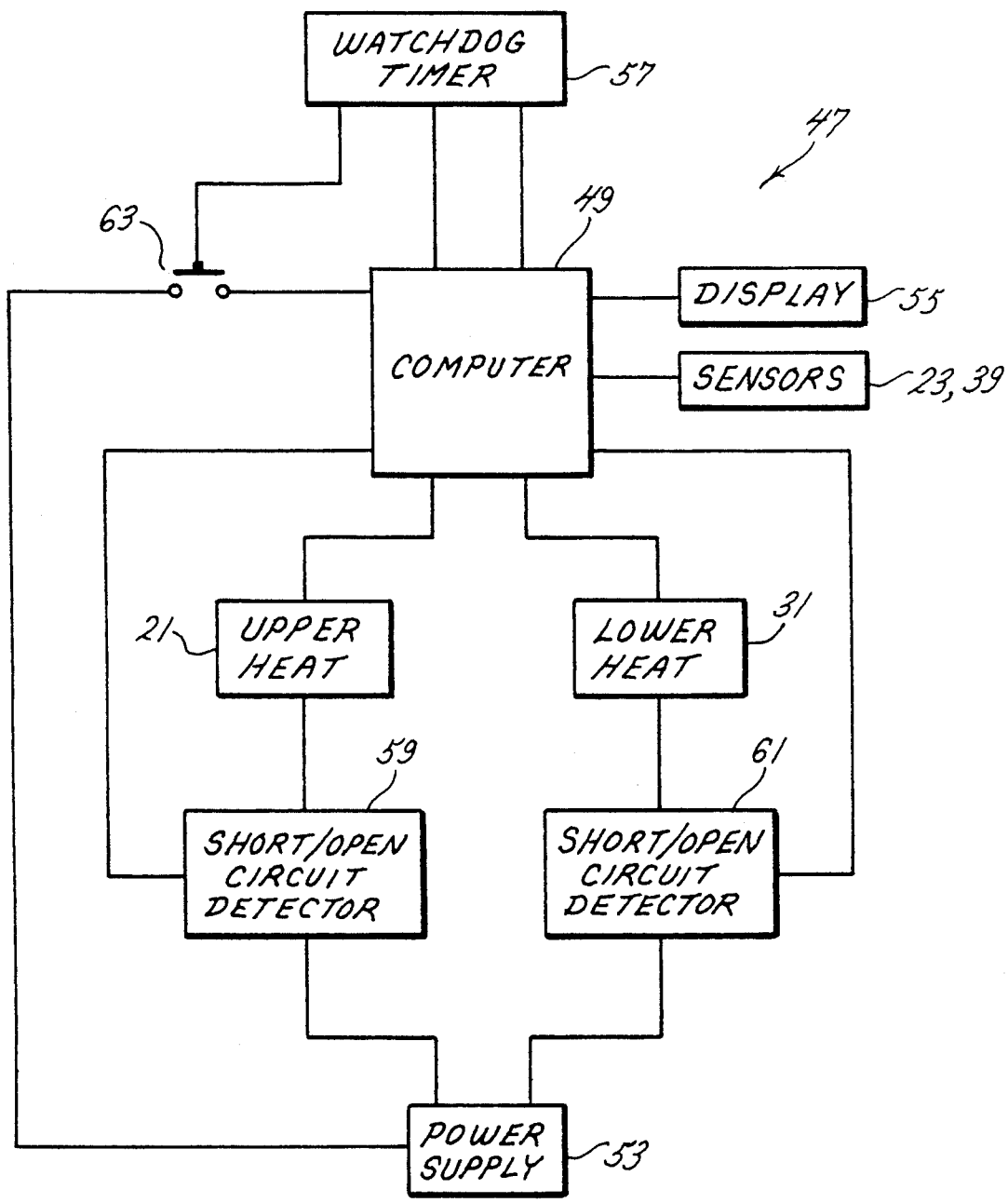
FIG. 3 is a block diagram of an electronic controller of the present invention.

A block diagram of the controller 47 is shown in FIG. 3. The controller 47 includes a computer 49 including a microprocessor 51 (see FIGS. 4a and 4b), a power supply 53, a display 55, a watchdog timer 57, the sensors 23 and 39, and a pair of short/open circuit detectors 59 and 61. The power supply 53 is connected to the short/open circuit detectors 59 and 61 and also to the computer 49 by an electronic switch 63 which is controlled by the watchdog timer 57. Each of the short and open circuit detectors 59 and 61 is connected to one of the heat sources 21 and 31 and the computer 49. The heat sources 21 and 31 are also connected to the computer 49. Additionally, the computer 49 is connected to the sensors 23 and 39 and the display 55.

The watchdog timer 57 functions as a timer to reset the computer 49 if the computer 49 does not periodically communicate with the watchdog timer 57. When the computer 49 is operating properly it sends a signal to the watchdog timer 57 which inhibits the timer 57 from resetting the computer 49. However, if a signal is not sent from the computer 49 to the timer 57, the timer 57 will re-initialize the computer 49. The watchdog timer 57 also includes a low voltage detector circuit to turn the computer 49 off in the event of low voltage levels being sensed.

The short/open detector circuits 59 and 61 provide protection to the controller 47. If a short circuit is detected, the detector 59 or 61 will respond by deactivating its associated heat source 21 or 31. On the other hand, if an open circuit is detected, the detector 59 or 61 will display an alarm message on the display 55 to alert the operator that a heat source 21 or 31 has failed.

Figure 4A:
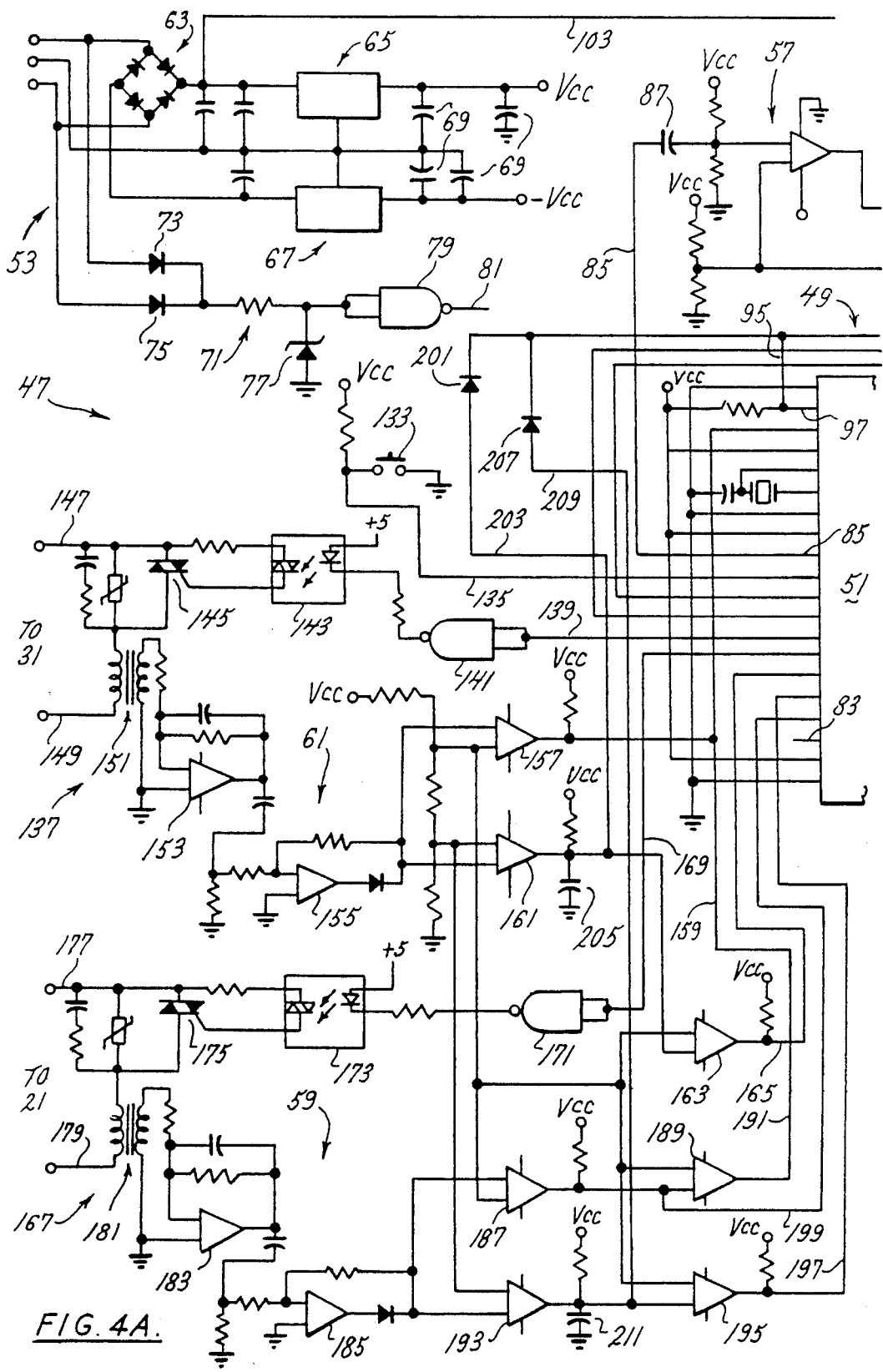
FIGS. 4A and 4B are schematic diagrams of the electronic controller of FIG. 3.
Figure 4B:
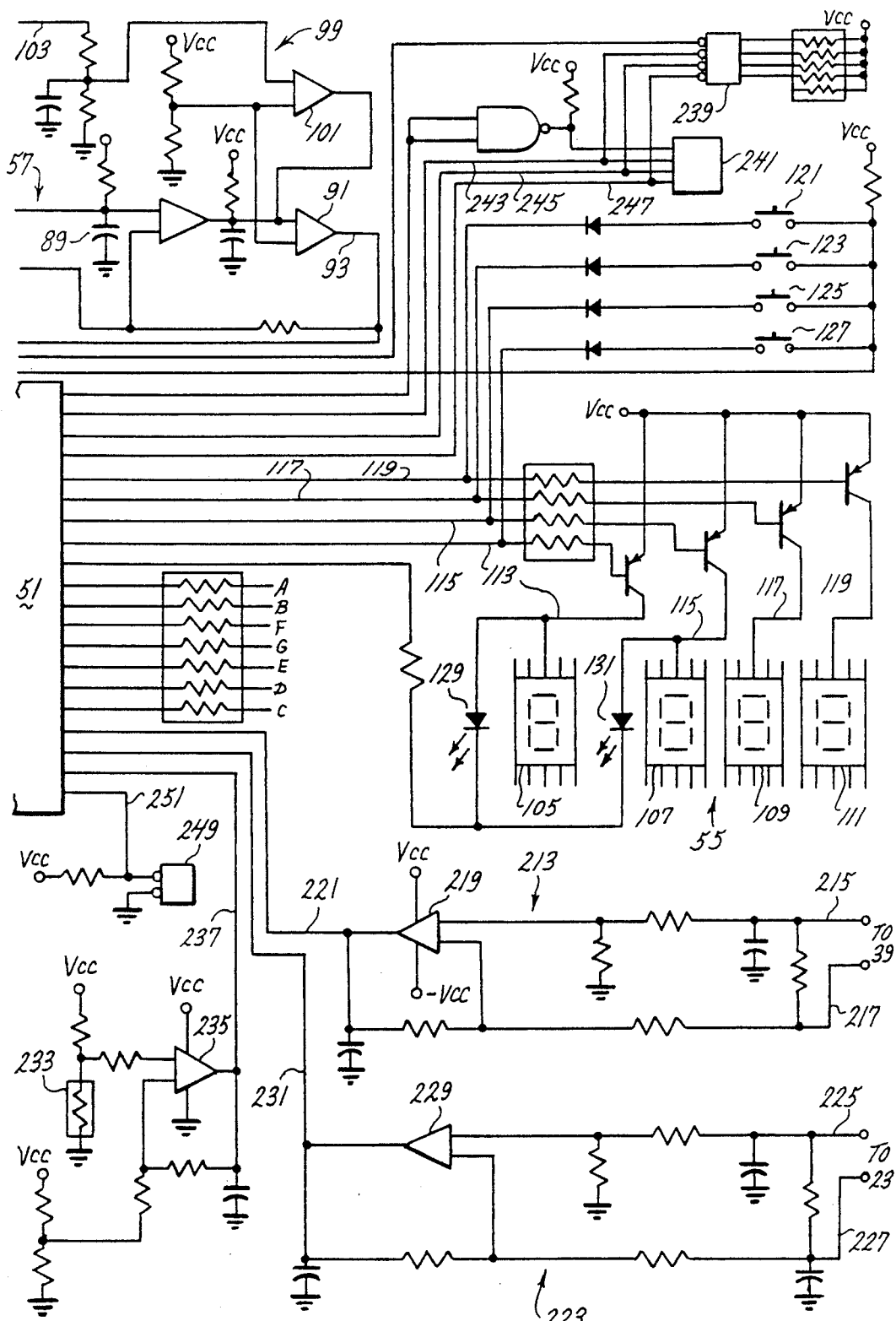

FIGS. 4A and 4B show a detailed schematic diagram of the controller 47. The controller 47 includes the computer 49 which has a microprocessor 51 such as a Motorola 68705, the power supply 53, display 55, watchdog timer 57, sensors 23 and 39, and the pair of short/open circuit detectors 59 and 61. The power supply 53 includes a transformer (not shown) which steps down AC input voltage and feeds it to a full wave bridge rectifier 63. The output of the rectifier 63 is supplied to a pair of DC voltage regulator circuits 65 and 67. The outputs of the regulators 65 and 67 are filtered by capacitors 69 and the filtered signals are used to power the controller 47. The power supply 53 also includes an interrupt signal circuit 71 for interrupting and protecting the microprocessor 51 in the event that a large voltage signal is output from the transformer. The interrupt signal circuit 71 includes a pair of diodes 73 and 75, a zener diode 77, and a NAND gate 79. The output 81 of the NAND gate 79 is connected to an input 83 of the microprocessor 51. The zener diode 77 clamps voltages above 4.7 volts. If a voltage signal below 4.7 volts occurs, then the NAND gate 79 will go low to interrupt the microprocessor 51.

The watchdog timer 57 receives a signal periodically from the microprocessor 51 via a line 85. The signal on line 85 charges a capacitor 87 which prevents capacitor 89 (see FIG. 4B) from charging. If the microprocessor 51 fails to send a signal on line 85 capacitor 89 will charge which causes a signal from a comparator 91 to be supplied via lines 93 and 95 to a Reset input 97 of the microprocessor 51. This reset signal re-initializes the internal parameters of the microprocessor 51.

The watchdog timer 57 also includes low voltage detection circuitry 99. This circuit 99 includes a comparator 101 which is connected to the input voltage via a line 103. The comparator 101 compares the input voltage against a predetermined voltage level. If the input voltage drops below the low level voltage the watchdog timer 57 will turn off the microprocessor 51 until the input voltage rises above the low level voltage.

Display 55 includes four LED (Light Emitting Diode) segments 105, 107, 109, and 111 for displaying the set point temperature and various messages. The segments 105-111 are connected to the microprocessor 51 via lines 113, 115, 117, and 119, respectively. Also connected to lines 113-119 are switches 121, 123, 125, and 127. Switches 125 and 127 are for manually turning on the heat sources 31 and 21. An LED 129 is connected to display segment 105. When switch 127 is actuated to activate heat source 21, LED 129 is on. Another LED 131 is connected to segment 107 to indicate that the heat source 31 is activated. Switches 121 and 123 are for selecting the set point temperature. Switch 123 increases the set point temperature by one degree increments and switch 121 decreases the set point temperature by one degree increments when pressed.

Switch 133 is connected to the microprocessor 51 via a line 135 for displaying the present set point temperature. Switch 133 must be pressed when selecting the set point temperature when either switch 121 or switch 123 is actuated.

The microprocessor 51 is connected to the lower heat source 31 by circuitry 137. The circuitry 137 is connected to the microprocessor 51 via a line 139. Line 139 is connected to NAND gate 141. The output of NAND gate 141 is supplied to an optically coupled triac 143. The output of triac 143 is provided to triac 145. Triac 143 optically isolates the microprocessor 51 from the high voltage which passes through triac 145. This protects the small signal electronics from possible short circuits of the lower heat source 31. Once current passes through triac 145 the lower heat source 31 begins to operate.

In order to detect a short or open condition of the lower heat source 31 the short/open circuit detector 61 is included in circuitry 137. Current is provided to the lower heat source 31 via lines 147 and 149. Line 149 passes through a toroidal inductor 151. As current passes through the inductor 151 a voltage is generated based upon the time rate of change of the current. Increasing or decreasing current through the inductor 151 causes a corresponding increase or decrease of the induced voltage. The induced voltage is amplified by operational amplifier (op amp) 153 and converted to a d.c. signal by op amp 155. This d.c. signal is then compared by comparator 157 against a voltage that simulates a short circuit. If the induced voltage rises above the voltage level established for a short circuit then a signal is supplied at the output of comparator 157 via a line 159 to the microprocessor 51 to interrupt the microprocessor 51. Once interrupted the microprocessor 51 turns off the lower heat source 31. The induced voltage is also compared by comparator 161 against a voltage that simulates an open circuit. Comparator 163 conditions the signal for the microprocessor 51. If the induced voltage decreases below the voltage level established for an open circuit, then a signal is supplied via a line 165 to the microprocessor 51 for turning the lower heat source 31 off.

The microprocessor 51 is connected to the upper heat source 21 by circuitry 167. The circuitry 167 is connected to the microprocessor 51 via a line 169. Line 169 is connected to NAND gate 171. The output of NAND gate 171 is supplied to an optically coupled triac 173. The output of triac 173 is provided to triac 175. Triac 173 optically isolates the microprocessor 51 from the high voltage which passes through triac 175. This protects the small signal electronics from possible short circuits of the upper heat source 21. Once current passes through triac 175 the upper heat source 21 begins to operate.

In order to detect a short or open condition of the upper heat source 21 the short and open circuit detector 59 is included in circuitry 167. Current is provided to the upper heat source 21 via lines 177 and 179. Line 179 passes through a toroidal inductor 181. As current passes through the inductor 181 a voltage is generated based upon the time rate of change of the current. Increasing or decreasing current through the inductor 181 causes a corresponding increase or decrease of the induced voltage. The induced voltage is amplified by op amp 183 and converted to a d.c. signal by op amp 185. This d.c. signal is compared by comparators 187 and 189 against a voltage that simulates a short circuit. If the induced voltage rises above the voltage level established for a short circuit then a signal is supplied at the output of comparator 189 via a line 191 and line 159 to the microprocessor 51 to interrupt the microprocessor 51. Once interrupted the microprocessor 51 turns off the upper heat source 21. The induced voltage is also compared by comparator 193 against a voltage that simulates an open circuit. Comparator 195 conditions the signal for the microprocessor 51. If the induced voltage decreases below the voltage level established for an open circuit, then a signal is supplied via a line 197 to the microprocessor 51 for turning the upper heat source 21 off.

The output of comparator 187 is connected via a line 199 to the microprocessor 51. A signal on line 199 indicates that the upper heat source 21 has short circuited. When a signal is not present on line 199 and a signal is present on line 159 this indicates that the lower heat source 31 is short circuited.

Diode 201, connected to the output of comparator 161 via a line 203, is employed for discharging capacitor 205 upon initial powering of the controller 47. Additionally, diode 207, connected to the output of comparator 193 via a line 209, is used to discharge capacitor 211 upon initial start up of the controller 47.

Sensor 39 is connected to a conditioning circuit 213 via lines 215 and 217. The conditioning circuit 213 includes an op amp 219 having its output connected to the microprocessor 51 via a line 221. Sensor 39 is used for sensing the temperature of the lower heat source 31. Sensor 23 is connected to a conditioning circuit 223 via lines 225 and 227. The conditioning circuit 223 includes an op amp 229 having its output connected to the microprocessor 51 via a line 231. Sensor 23 is used for sensing the temperature of the food.

Since the microprocessor 51 has a maximum operating temperature that must not be exceeded to prevent possible malfunction a sensor 233 is provided for sensing the temperature of the controller 47. A signal from the sensor 233 is sent to an op amp 235. The output of op amp 235 is connected to the microprocessor 51 via a line 237. If the sensed temperature exceeds a predetermined operating temperature then the microprocessor 51 will turn off the heat sources 21 and 31.

The controller 47 also includes a communications connector 239. Sensors 23 and 39 may require testing or calibrating which is accomplished by connecting calibration equipment to communications connector 239. The communications connector 239 allows for adjusting or offsetting the sensors 23 and 39. These offset amounts are stored in a memory 241. Upon initial powering of the controller 47 these stored values are read from the memory 241 into the microprocessor 51 via lines 243, 245, and 247. The memory 241 stores other information including the set point selected by the operator. The set point is read from the memory 241 and is also written to memory 241.

An optional feature of the controller 47 includes the ability to connect a timer (not shown) for initializing the controller 47 at various times. For example, if the hot table 11 needs to be ready to warm prepared food by 7:00 a.m. and the operator arrives at this time, the hot table 11 needs to be operating and warming by 6:00 a.m. In order to accomplish this, a timer is connected to a connector 249. The output of the connector is supplied to the microprocessor 51 via a line 251. When the timer begins a signal is sent over line 251 to the microprocessor 51 to initiate operation of the controller 47 and the hot table 11.

A control panel 253 for the controller 47 is shown in FIG. 5. The control panel 253 is positioned on the back side of the hot table 11. The control panel 253 includes the display 55, switches 121–127 and 133, and LEDs 129 and 131. The control panel 253 allows the operator to select the set point of the food to be warmed. This is accomplished by pressing switches 125 and 127 to turn on both heat sources 21 and 31. The probe 23 is then inserted into the food 19. The operator then presses switch 133 and the previously selected set point is displayed. If a new set point is desired the operator continues to press switch 133 and either switch 121 or switch 123 is pressed to increase or decrease the previously selected set point. For example, if the previously selected set point was 150° F. and the desired set point is 155° F., then switch 123 is pressed until the display 55 shows 155° F.

The display 55 also indicates various messages to the operator in addition to displaying the set point. One message that is shown on the display 55 is "A-LO" which indicates that the controller 47 has determined the temperature of the food has dropped below a minimum temperature for a period of time. For example, the microprocessor 51 is programmed to determine if the food temperature is below 135° F. for more than five minutes. Another message that is displayed is "A-HI" which indicates that the controller 47 has determined the temperature of the food has risen above a maximum temperature for a period of time. For example, the microprocessor 51 is programmed to determine if the food temperature is above 175° F. for more than five minutes.

Other messages that are displayed include "ERR1", "ERR2", "ERR3", and "ERR4". The ERR messages indicate either that a short circuit or an open circuit condition has been detected and in which heat source the detected condition has occurred. For example, "ERR1" indicates that a short circuit condition has been detected in the upper heat source 21, "ERR2" indicates that an open circuit condition has been detected in the upper heat source 21, "ERR3" indicates that a short circuit condition has been detected in the lower heat source 31, and "ERR4" indicates that an open circuit condition has been detected in the lower heat source 31. Additionally, if a high ambient temperature has been detected by sensor 233 then a "HELP" message is displayed to indicate this condition.

After the food 19 in the hot table 11 has been served the heat sources 21 and 31 are turned off by pressing switches 125 and 127. This places the controller 47 in a cool down mode of operation. When the temperature of the lower heat source 31 equals 105° F. then the food pans 17 will be cool. Once cooled the food pans 17 are removed for cleaning. In order to indicate to the operator when the pans 17 are sufficiently cool the display 55 will initially display an "h" in each segment 105–111. Upon cooling below a first range of temperatures the "h" in segment 105 will be removed. The removal of the "h" in each segment will continue until the temperature sensed by the probe 39 equals 105° F. At this time "COOL" will be displayed.

The heat sources 21 and 31 may be manually disconnected. If, for example, switch 127 is actuated then the upper heat source 21 is deactivated and a "L-OF" message is displayed. On the other hand, if switch 125 is actuated then the lower heat source 31 is deactivated and a "H-OF" message is displayed.

Figure 6A:
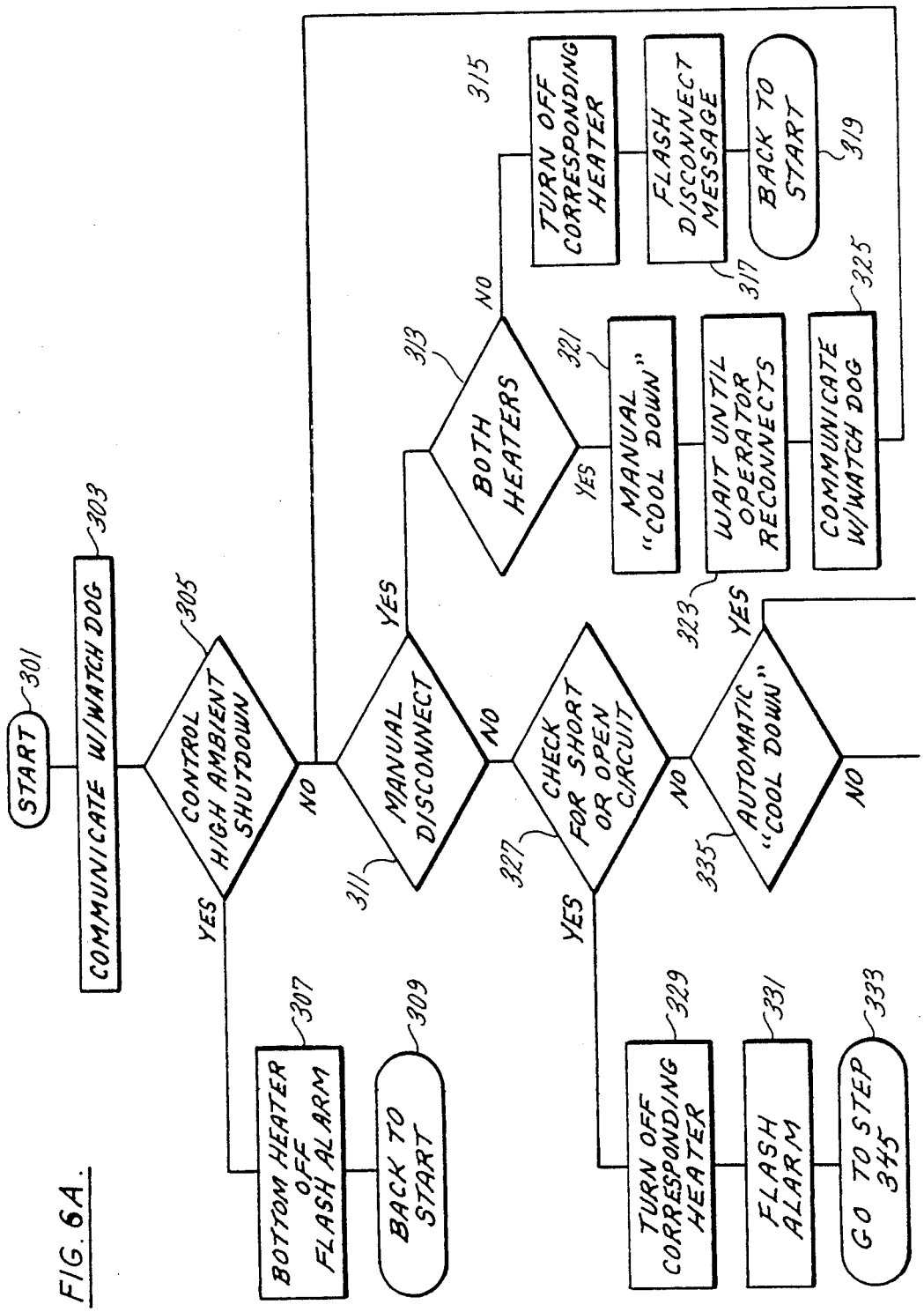
FIGS. 6A and 6B are a flow chart of the operation of the electronic controller.
Figure 6B:
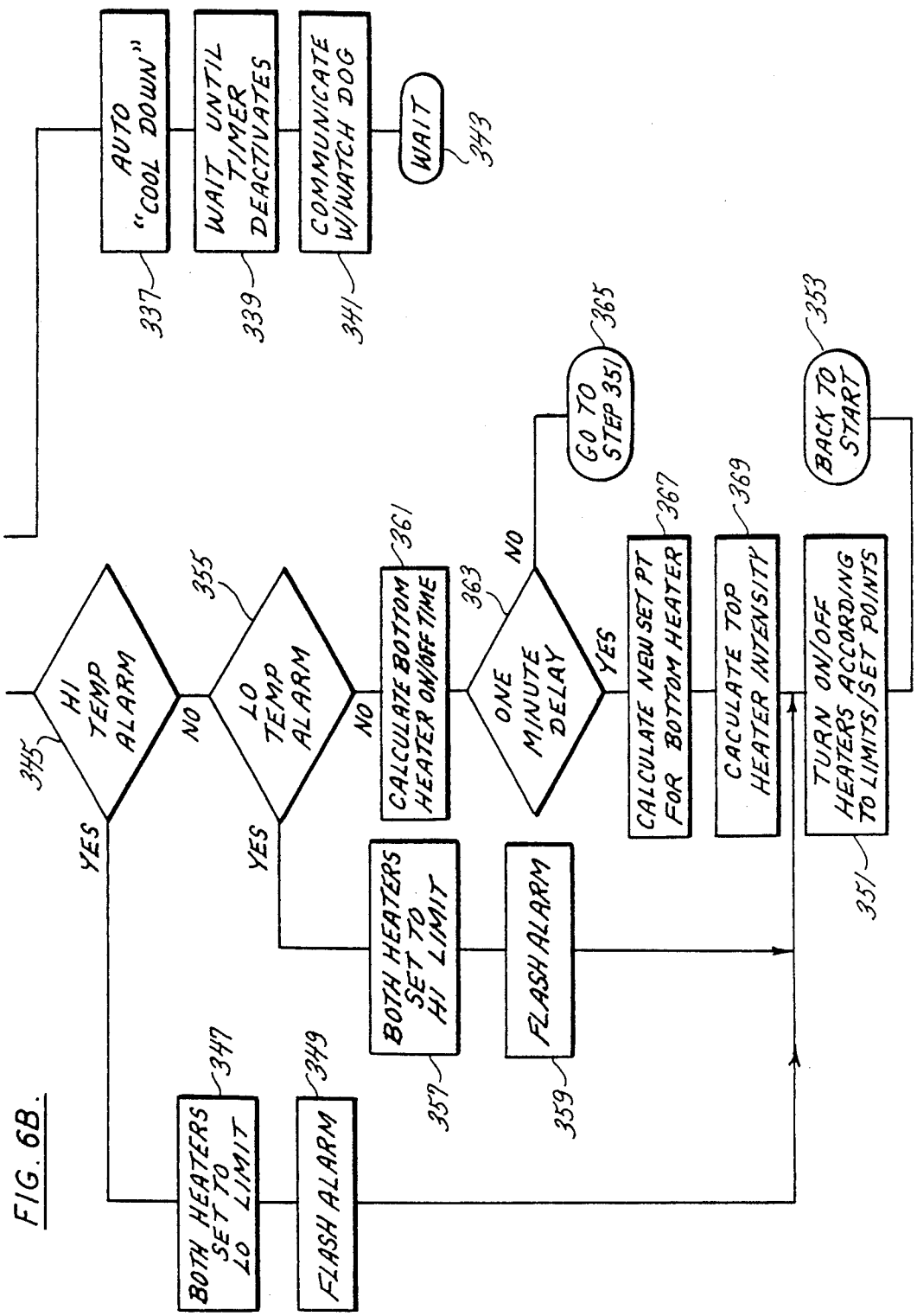

FIGS. 6A and 6B show a flow chart of a program which is stored in the microprocessor 51 for controlling the operation of the controller 47. The program begins when power is supplied to the hot table 11 and switches 125 and 127 are pressed to turn on both of the heat sources 21 and 31. This is indicated by step 301. In the next step 303, the microprocessor 51, if functioning properly, communicates with the watchdog timer 57. If the microprocessor 51 does not communicate then the watchdog timer 57 will reset the microprocessor 51. The program, in step 305, decides whether sensor 233 is detecting a board ambient temperature within 5° F. of the maximum operating temperature of the microprocessor 51. If it is, then the lower heat source 31 is turned off and "HELP" is displayed (step 307). The program then cycles back to step 301 as indicated by step 309. If a high ambient temperature is not sensed the program continues to step 311 where the program decides if either of the switches 125 or 127 is off. A switch in the off state indicates that the associated heat source has been manually disconnected. If either or both of the heat sources have been disconnected the program continues to step 313. In step 313 it is determined whether both of the heat sources have been manually disconnected. If only one of the switches has been actuated then its corresponding heat source is disconnected in step 315 and either "L-OF" or "H-OF" is displayed in step 317 depending upon which heat source has been disconnected. The control of the program then proceeds to step 319 which returns the program back to step 301. When both of the switches have been actuated, indicating the controller 47 is in the cool down mode, all of the segments of the display 55 will show an "h". The "h's" will disappear as the hot table 11 cools and the "COOL" message will be displayed upon the temperature sensed by sensor 23 equaling the temperature sensed by sensor 39. The next steP 323 requires the controller 47 to wait until the operator manually activates the heat sources 21 and 31. If this occurs then the microprocessor 51 communicates with the watchdog timer 57 (step 325) and the program returns to step 311.

If a manual disconnect of one or both of the heat sources has not occurred the program continues to step 327 to decide whether a short or open condition is present. If a short or open circuit condition is present then in step 329 the corresponding heat source is deactivated. The program in step 331 displays one of the ERR messages and then goes to step 345 as indicated by step 333. If a short or open circuit condition is not present the program proceeds to step 335. In step 335 it is decided whether an automatic cool down mode has been initiated. Automatic cool down occurs if an optional timer is connected to the controller 47 at connector 249. If the automatic cool down mode is initiated then the program in step 337 turns off both the heat sources 21 and 31. All of the segments of the display 55 will show an "h". The "h's" will disappear as the hot table 11 cools and the "COOL" message will be displayed upon the temperature sensed by sensor 39 equaling 105° F. The program, in step 339, waits until the timer is deactivated. The microprocessor 51 communicates with the watchdog timer 57 (step 341) and the program continues to step 343 until the cool down mode is deactivated.

If the automatic cool down mode is not selected then the program continues to step 345. In step 345 it is determined whether a high temperature condition has been detected. If a high temperature condition has been detected then in step 347 both heat sources 21 and 31 are decreased to their corresponding low limits. For example, the lower heat source 31 is decreased to 150° F. and the upper heat source 21 is decreased to 10% of its intensity. The alarm message "A-HI" is displayed (step 349) and the program proceeds to step 351. In step 351 the heat sources 21 and 31 are adjusted and in step 353 the program returns to step 301.

If a high temperature condition is not detected the program continues to step 355 where it is decided whether a low temperature condition has been detected. If a low temperature condition has been detected then in step 357 both heat sources 21 and 31 are increased to their corresponding high limits. For example, the lower heat source 31 is increased to 300° F. and the upper heat source 21 is increased to 99% of its intensity. The alarm message "A-LO" is displayed (step 359) and the program proceeds to step 351. In step 351 the heat sources 21 and 31 are adjusted and in step 353 the program returns to step 301.

If a low temperature condition has not been detected then the program proceeds to step 361 for calculating the lower heat source 31 on/off time. The lower heat source 31 has power supplied to it in two second intervals or cycles. The time interval in which the lower heat source 31 is on or off is defined as its duty cycle. In calculating the on/off time or the duty cycle of the lower heat source 31 the microprocessor 51 first compares the temperature sensed by sensor 39 against an internal set point of the lower heat source 31. The memory 241 stores the initial internal set point of the lower heat source 31. This internal set point is not adjustable by the operator. However, the internal set point is adjusted by the program stored in the microprocessor 51. An example of the internal set point stored in the memory 241 is 236° F. If the temperature is more than eight degrees higher than the internal set point, then the lower heat source 31 is not activated for the two second cycle. If the temperature is less than eight degrees lower than the internal set point, then the lower heat source 31 is activated for the entire two second cycle. If the temperature is not greater than eight degrees higher than the internal set point or not lesser than eight degrees lower than the internal set point, then the difference between the temperature sensed by sensor 39 and the internal set point is calculated. The time the lower heat source 31 is activated during the two second cycle is based upon this calculated difference. The higher the sensed temperature is above the internal set point the longer the lower heat source 31 will be off during the two second cycle. The lower the sensed temperature is below the internal set point the longer the lower heat source 31 will be on during the two second cycle. For example, assuming the internal set point to be 250° F. and the sensed temperature to be 246° F., then the lower heat source 31 will be on longer than it is off during the two second cycle.

After the on/off time of the lower heat source 31 has been calculated the program continues to step 363 to determine whether a one minute delay period has elapsed. If it has not the program proceeds to step 365 which directs the program to step 351. If the one minute delay period has elapsed then the program continues to step 367.

In step 367 a new internal set point for the lower heat source 31 is calculated. In calculating the new internal set point for the lower heat source 31, the microprocessor 51 determines the change in the temperature of the food over a period of time, for example the previous minute. The difference between the temperature of the food and the operator selected set point is then determined. Adding the change and the difference totals results in the new internal set point of the lower heat source 31.

After the new internal set point for the lower heat source 31 is calculated the program proceeds to step 369 where the intensity of the upper heat source 21 is determined. Upon the controller 47 beginning operation in step 301, the upper heat source 21 is set to its highest intensity level, for example 99%. In calculating the upper heat source intensity the microprocessor 51 determines if the temperature of the food is greater than the set point. If it is, then the intensity of the upper heat source is decreased by, for example, 4%. If the microprocessor 51 determines that the temperature of the food is less than the set point, then the intensity of the upper heat source is increased by, for example, 4%. When the microprocessor 51 determines that the temperature of the food equals the set point there is no adjustment in the intensity of the upper heat source.

The program continues to step 351 where the heat sources are adjusted in accordance with the results calculated in steps 367 and 369. The program proceeds to step 353 which returns the program to step 301.

A few examples of the operation of the program will now be explained in detail. In operation the program shown in the flow chart of FIGS. 6A and 6B begins when power is supplied to the controller 47 and switches 125 and 127 are actuated. Additionally, the internal set point and the previous operator selected set point are read from the memory 241 into the microprocessor 51. At this time the operator may select a new set point at which the food is to be keep warm, if necessary. The program then proceeds through steps 303, 305, 311, 327, 335, 345, and 355 to step 361. In step 361 the lower heat source 31 on/off time is calculated. Since the temperature sensed by sensor 39 is at ambient temperature due to the lower heat source 31 being turned on for less than one second, the calculated on/off time will be the entire two second cycle. The program will then continue to step 351. Once the one minute delay has elapsed the program will proceed to step 367.

In step 367 the new internal set point for the lower heat source is calculated. The change in the food temperature over the previous minute is calculated. For example, it is suggested that the hot table 11 be operating without any food placed in the case 13 for at least one hour. In this example the change will be the change in the initial ambient temperature and the ambient temperature sensed one minute later. In this case the initial ambient temperature may be 72° F. and the ambient temperature sensed one minute later may be 76° F. for a rate of change of 4° F. This change is multiplied by a factor of four by the program. Next, the difference between the food temperature and the set point selected by the operator is calculated. Assuming the selected set point is 150° F. and the ambient temperature (since food is not yet placed in the hot table) is 76° F., the difference is −74° F. This is added to the quadrupled change in the temperature and the old internal set point to result in a new internal set point for the lower heat source 31. In this example, the new internal set point is 16−74+236 for a total of 178° F. When calculating the new internal set point, if its value is above 300° F., the high limit of operation of the lower heat source 31, the program truncates to 300° F. Additionally, if the calculated new internal set point value is below 150° F., the low limit of operation of the lower heat source 31, the program raises the value to 150° F.

If for example food is placed in the hot table 11 and the food has a temperature of 160° F. then the internal set point is calculated in the following manner. Assuming the internal set point is at 240° F. and the change in temperature for the previous minute was 50° F. (which is multiplied by four to be 200° F.). The difference between the set point and the food temperature is calculated, which is 10° F. (160° F.-150° F.). This yields a new internal set point of 40° F. (240° F.-210° F.). However, since the new internal set point is below 150° F., the program raises this value to 150° F. The duty cycle of the lower heat source 31 is calculated in the following manner. Assuming the temperature sensed by sensor 39 is 240° F., then 240° F.-150° F. (the new internal set point) is 90° F. Since 90° F. is eight degrees higher than the internal set point, the lower heat source 31 will not be activated for the two second cycle.

FIG. 7 illustrates an automatic water fill system 401 of the present invention. The system 401 includes a water supply inlet line 403 connected to a float actuated valve assembly 405 in a reservoir tank 407. The supply line 403 includes a check valve 409. The tank 407 is connected to a primary supply pipe 411 which branches to secondary supply pipes 413. The secondary supply pipes 413 are connected to each of the water pans 29 of the hot table 11. The tank 407 includes a reservoir overflow pipe 415 for preventing the water from overflowing the tank 407. The overflow pipe 415 empties into a drain trough 417 which may be connected to a drain pipe (not shown). Each of the secondary supply pipes 413 includes a three way valve 419 for directing water flow either into the water pans 29 or into the drain trough 417.

The water fill system 401 operates to continually maintain the level of water in each of the water pans 29 at a constant level. The water fill system 401 operates in the following manner. To initially fill the water pans 29 the valves 419 are positioned to direct water flow into the water pans 29. Water from the inlet pipe 403 flows into the tank 407 and out through the primary supply pipe 411 into the secondary supply pipes 413 and the water pans 29. The water level in the pans 29 and tank 407 are essentially the same. The continued supply of water ultimately reaches a maximum level in which the float assembly 405 shuts off the water flowing from the inlet pipe 403 to the tank 407. When the water level in the water pans 29 drops due to evaporation the water level in the tank 407 also drops. The float assembly 405 opens to allow water to flow into the tank 407. The water flows from the tank 407 into the water pans 29 to refill the water pans 29. The float assembly 405 again shuts off the water supply inlet 403 when the water level reaches the maximum level. To empty the water pans 29 for cleaning, the valves 419 are positioned to direct water flow from the water pans 29 into the drain trough 417.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. Apparatus for controlling food temperatures in a food warming cabinet having at least one food holding zone comprising:
    first means for sensing a temperature representative of the temperature of the food product;
    first temperature producing means forming a primary heat source;
    second means for sensing a temperature representative of an operating condition of the apparatus; and
    controller means connected to receive sensed input signals from said first and second means, and being constructed and arranged for controlling the operation of said first temperature producing means in response to the sensed input signals, said controller means including means for selecting a set point value forming an ideal temperature condition for the food product and first determining means for detecting when the temperature sensed by said first sensing means is below a minimum temperature for a predetermined time.

2. The apparatus according to claim 1, in which said first means comprises a temperature sensing probe adapted for insertion internally into the food product in said food holding zone.

3. The apparatus according to claim 1, in which said controller means includes means for varying the duty cycle of said first temperature producing means in response to said first determining means.

4. The apparatus according to claim 1, in which said controller means includes second determining means for detecting when the temperature sensed by said first sensing means is above a maximum temperature for a predetermined time.

5. The apparatus according to claim 4, including means for reducing the duty cycle of said primary heat source in response to said second determining means.

6. The apparatus according to claim 1, further comprising second temperature producing means forming a secondary heat source, said controller means being constructed and arranged for controlling the intensity of said second temperature producing means in response to the sensed input signals from said first and second means, said controller means including means for determining when the temperature sensed by said first sensing means deviates in either direction from said set point value.

7. The apparatus according to claim 6, in which said controller means includes means, responsive to said first determining means, for increasing the frequency or intensity of one of said primary and secondary heat sources when said first determining means indicates a predetermined temperature deviation below said set point temperature.

8. The apparatus according to claim 7, in which said primary heat source is a lower heater cyclically operated by said controller means on a variable on/off cycle, and said on duty time is increased in response to said determining means.

9. The apparatus according to claim 7, in which said primary heat source is a lower heater having a variable temperature intensity controlled by said controller means.

10. The apparatus according to claim 7, in which said secondary heat source is an upper heater having a variable temperature intensity controlled by said controller means.

11. The apparatus according to claim 1, in which said first temperature producing means includes a temperature transfer mass associated with the food holding zone.

12. The apparatus according to claim 11, in which the temperature producing means comprises a lower heat source, and said temperature transfer mass comprises a hot water tray.

13. The apparatus according to claim 1, in which said controller means includes means for detecting a short circuit or an open circuit condition in the first temperature producing means.

14. The apparatus according to claim 1, in which said food warming cabinet is a water heated hot table, and further comprising an automatic water level regulator including:
    means for filling the hot table with water; and
    means for determining when the water level in the hot table is below a predetermined level and for activating the filling means as long as the water level is below the predetermined level.

15. The apparatus of claim 14 wherein said means for filling comprises a water inlet line and said means for determining comprises a tank for receiving water supplied by the water inlet line, a supply line for supplying water in the tank to the hot table and means for maintaining the water level fo the tank within a predetermined range.

16. The apparatus of claim 15 wherein said means for maintaining comprises a float actuated valve assembly.

17. A device for controlling warming of food in a hot table, the hot table including an upper heat source and a lower heat source, the device comprising:
   first means for sensing a temperature representative of the temperature of the food;
   second means for sensing a temperature representative of the temperature of the lower heat source;
   controller means connected to receive sensed input signals from said first and second means and being constructed and arranged for controlling the operation of both the heat sources in response to the sensed input signals, said controller means including first determining means for determining when the temperature sensed by the first means is below a minimum temperature for a predetermined pierod of time.

18. The device of claim 17 wherein said controller means comprises means for selecting a set point temperature, and means for controlling intensity of the heat sources in response to a difference between the temperature of the food sensed by the first means and the set point temperature.

19. The device of claim 17 further comprising third means for sensing a temperature representative of an operating temperature of the controller, fourth means for detecting when the temperature sensed by the third means is above a maximum temperature, and means, responsive to the fourth means, for deactivating the device when the temperature sensed by the third means is above the maximum temperature.

20. The device of claim 19 further comprising means for indicating the temperature of the food sensed by the first means.

21. A method of controlling food temperatures in a display fixture having at least one food holding zone and first and second temperature producing means therefor, comprising the steps of:
   (i) sensing a temperature condition of the food in the food holding zone and establishing an input data base representative of such condition,
   (ii) analyzing said input data base with respect to a predetermined set point value forming an ideal temperature condition for the food and producing a control signal;
   (iii) controlling the operating conditions of the first temperature producing means when said control signal exceeds the limits of a positive to negative tolerance range from said set point value, and
   (iv) regulating the intensity of the second temperature producing means when said control signal is within the tolerance range but deviates from said set point value whereby to substantially maintain said food holding zone at said set point value.

22. The method according to claim 21, in which said display fixture is a commercial food warming cabinet and said first temperature producing means is a primary heat source, and wherein one operating condition of step (iii) comprises:
   (a) varying the duty cycle of said primary heat source.

23. The method according to claim 21, in which said display fixture is a commercial food warming cabinet and said first temperature producing means is a primary heat source, and wherein one operating condition of step (iii) comprises:
   (a) variably controlling the intensity of said primary heat source.

24. The method according to claim 21, in which said display fixture is a commercial food warming cabinet and said first temperature producing means is a primary heat source, and step (iii) comprises:
   (a) selectively operating said primary heat source on a variable duty cycle; and
   (b) variably controlling the heating magnitude of said primary heat source.

25. The method according to claim 24, which further comprises the step of:
   (v) sensing an operating temperature of said primary heat source and establishing a second input data base representative of such temperature.

26. The method according to claim 25, in which said second temperature producing means is a secondary heat source, and wherein step (iv) comprises:
   (a) operating said secondary heat source at a preselected minimum heating level; and
   (b) variably controlling the heating intensity of said secondary heat source.

27. The method according to claim 21, in which said display fixture is a commercial food warming cabinet and said second temperature producing means is a secondary heat source, and wherein step (iv) comprises:
   (a) continuously operating said secondary heat source; and
   (b) variably controlling the heating intensity of said secondary heat source.

28. The method according to claim 27, wherein said first and second temperature producing means are lower and upper heat sources, respectively, and wherein step (ii) comprises:
   (a) analyzing said first and second input data bases and providing an output control signal derived from analyzing the data bases; and
   (b) selectively controlling and regulating said lower and upper heat sources to substantially maintain the internal cooked food temperatures at the selected set point value therefor.

29. The method according to claim 21, in which said display fixture is a commercial food warming cabinet for displaying and serving pre-cooked food, and wherein step (i) comprises:
   (a) sensing and monitoring the internal cooked food temperature and providing a variable first input data base representative of changes in the monitored temperature.

30. The method according to claim 29, in which said first temperature producing means is a primary heat source, and which further comprises the step of:
   (v) sensing an operating temperature of said primary heat source and establishing a variable second input data base representative of such temperature.

31. The method according to claim 30, wherein one operating condition of step (iii) comprises:
   (a) cyclically operating said primary heat source on a variable duty cycle.

32. The method according to claim 30. wherein one operating condition of step (iii) comprises:

(a) variably controlling the heating intensity of said primary heat source.

33. The method according to claim 30, wherein step (iii) comprises:

(a) selectively operating said primary heat source on a variable duty cycle; and
(b) variably controlling the heating intensity of said primary heat source.

* * * * *